United States Patent [19]

Omori et al.

[11] Patent Number: 4,914,729
[45] Date of Patent: Apr. 3, 1990

[54] METHOD OF FILLING POLYGONAL REGION IN VIDEO DISPLAY SYSTEM

[75] Inventors: Mutsuhiro Omori, Atsugi; Hidefumi Terada; Minoru Morimoto, both of Hamamatsu, all of Japan

[73] Assignee: Nippon Gakki Seizo Kabushiki Kaisha, Shizuoka, Japan

[21] Appl. No.: 16,071

[22] Filed: Feb. 18, 1987

[30] Foreign Application Priority Data

Feb. 20, 1986 [JP] Japan .................................. 61-35539

[51] Int. Cl.$^4$ ............................................. G09G 1/00
[52] U.S. Cl. .................................. 340/703; 340/728; 340/747
[58] Field of Search ............... 340/747, 750, 728, 720, 340/723, 729; 364/526

[56] References Cited

U.S. PATENT DOCUMENTS

| | | | |
|---|---|---|---|
| 4,425,559 | 1/1984 | Sherman ............................. | 340/747 |
| 4,646,076 | 2/1987 | Wiedenmen et al. ............... | 340/750 |
| 4,646,078 | 2/1987 | Knierim et al. ..................... | 340/747 |
| 4,648,050 | 3/1987 | Yamagami .......................... | 340/750 |

FOREIGN PATENT DOCUMENTS

2128459  9/1982  United Kingdom ................ 340/747

*Primary Examiner*—Alvin Oberley
*Attorney, Agent, or Firm*—Darby & Darby

[57] ABSTRACT

A method of filling a polygonal region enables a polygon of any shape to be filled with pixels with a simple algorithm. A display memory area and a working area each having a plurality of addresses correponding to all the pixels on a display screen are provided. A minimum rectangular area including the polygon is determined in accordance with all the polygon vertices, and the minimum rectangular area within the working area is cleared. A straight line (or an edge) connecting each pair of adjoining vertices of the polygon is described to the display memory area with predetermined values. The edges are also described to the working area but in accordance with three rules. Under Rule 1, when a constituent dot of the edge is described to the corresponding address, the data in the address is inverted. Under Rule 2, a start constituent dot of each edge is described only when the edge to be described has an inclination different in polarity from the precedingly described edge. Under Rule 3, the constituent dot of each edge is described only when the constituent dot is shifted in the vertical direction. Then, the rectangular area in the working area is scanned to detect dots in the state of "1" for each scanning line and to number the detected dots. Finally, addresses of the display memory area corresponding to each interval from the odd-numbered detected dot to the even-numbered detected dot are filled with predetermined values.

2 Claims, 8 Drawing Sheets

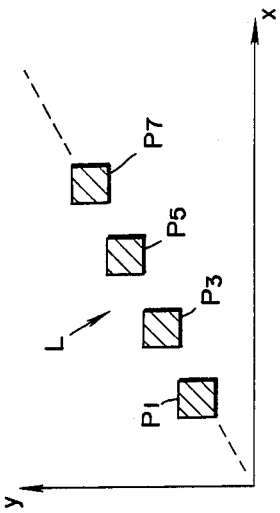
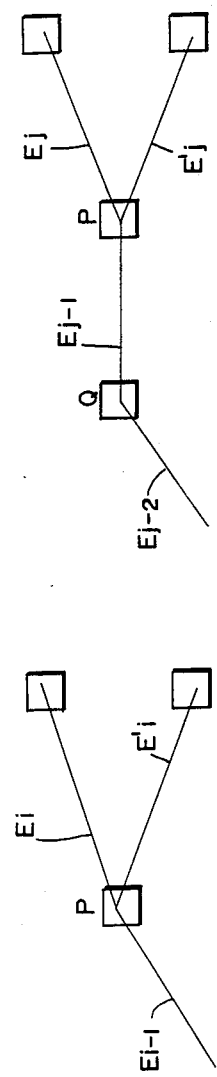
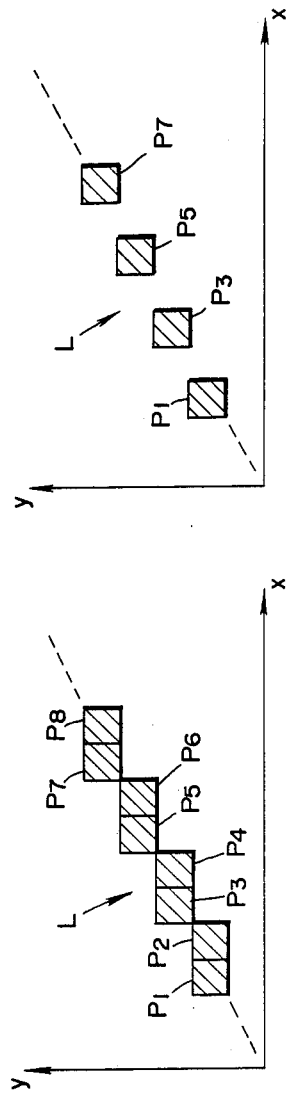

FIG. 9
PROCEDURE FOR FILLING THE POLYGONAL REGION (STEP 1)

ALL REGISTERS AND THE WORKING AREA ARE INITIALIZED (STEP 2)

THE POLYGON-FILLING CONTROLLER RECEIVES THE STARTING VERTEX COORDINATE $(X_1, Y_1)$ OF THE POLYGON TO BE FILLED THEN, SET $Xmax = X_1$, $Ymax = Y_1$,
$Xmin = X_1$, $Ymin = Y_1$.

(STEP 3)

THE POLYGON-FILLING CONTROLLER SEQUENTIALLY RECEIVES THE NEXT VERTEX COORDINATE $(X_i, Y_i)$ IF
$X_i > Xmax$, then set $Xmax = X_i$     $Y_i > Ymax$, then set $Ymax = X_i$
$X_i < Xmin$, then set $Xmin = X_i$     $Y_i \leq Ymin$, then set $Ymax = Y_i$

YES ← ANY CONDITION IN STEP 3 TRUE? → NO (STEP 4)

EXPAND THE WORKING AREA TO THE RECTANGULAR AREA DEFINED BY LOWER-LEFT EDGE OF $(Xmin, Ymin)$ AND UPPER-RIGHT EDGE OF $(Ymin, Ymax)$ (STEP 5)

A STRAIGHT LINE STARTING AT THE CURRENT POINT IS DRAWN TO THE NEWLY RECEIVED VERTEX.
THE CORRESPONDING STRAIGHT LINE IS ALSO DRAWN ON THE WORKING AREA DEFINED ABOVE SUBJECT TO THE RULES DESCRIBED LATER.

METHOD OF FILLING POLYGONAL REGION IN VIDEO DISPLAY SYSTEM

BACKGROUND OF THE INVENTION

1. Field of the Invention

This invention relates generally to a graphic display in a raster-scan type video display system and more particularly to an improved method of filling a polygonal region with pixels in such a raster-scan type video display system.

2. Prior Art

A method of filling a polygonal region with pixels is disclosed, for example, in Japanese Patent Application Laid-Open No. 59-22093. In this conventional method, three refresh memories corresponding respectively to red (R), green (G) and blue (B) colors are provided as well as a working memory which provides dots corresponding to all pixels on the screen. An outline of a polygon to be displayed is described to the refresh memories, and at the same time the outline of the polygon is described to the working memory as solid lines. Then, all the dots disposed inside the outline stored to the working memory are sequentially extracted therefrom, and the dots corresponding to the extracted dots are stored to the refresh memories. According to this conventional method, even if the outline of the polygon is stored to the refresh memories as lines other than solid lines (for example, as broken lines), the interior of the outline of the polygon can be properly filled.

The above-described conventional method is, however, disadvantageous in the following respects:

(a) All of the addresses of the working memory must be accessed, so that the number of accesses becomes significantly large, which results in a loss of much time.

(b) When the polygon is of a complicated shape, it is significantly difficult to completely extract all the dots disposed inside the polygon.

(c) In the case of the polygon being a concave polygon, it is most difficult to extract all the dots inside of the polygon by one predetermined data processing. As a result, it is necessary to carry out such a data processing at least twice.

Another method using such a working memory is disclosed in Japanese Patent Application Laid-Open No. 59-15289. Still another method which does not use such a working memory is disclosed in Japanese Patent Application Laid-Open No. 57-101886. However, these methods are also disadvantageous in that the number of vertices of the polygon is limited, that the kind of the outline or boundary of the polygon is restricted to certain ones, and that a large number of calculations must be performed.

SUMMARY OF THE INVENTION

It is therefore an object of the present invention provide a method of filling a polygonal region with pixels by which such a filling can be implemented at a high efficiency.

It is another object of the invention to provide a method of filling a polygonal region by which such a filling can be implemented with a simple algorithm.

According to an aspect of the present invention, there is provided a method of filling a polygonal region with valued pixels to display a polygon corresponding to the polygonal region on a display screen of a raster-scan type which provides a matrix array of pixels comprising the steps of:

(1) providing first memory means having a matrix array of addresses each for storing a value of a respective one of the pixels provided on the display screen, second memory means having a matrix array of memory locations corresponding respectively to the addresses of the first memory means, and reading means for sequentially reading the values from the addresses of the first memory means to display on the display screen a polygon represented by the values read from the addresses;

(2) receiving data representative of vertices of the polygon;

(3) determining a minimum rectangle including the polygon in accordance with the data representative of the vertices and clearing those memory locations of the second memorY means corresponding to the minimum rectangle;

(4) determining those addresses of the first memory means corresponding to constituent dots of straight lines each connecting a respective one of adjoining pairs of the vertices in accordance with the data representative of the vertices and determining those memory locations of the second memory means corresponding to the constituent dots of the straight lines in accordance with the data representative of the vertices;

(5) storing the straight lines to the first memory means by storing predetermined values into the those addresses of the first memory means, and sequentially storing the straight lines to the second memory means by storing data representative of "1" into the those memory locations of the second memory means in accordance with the following rules (a), (b) and (c):

(a) when the memory location to which the data representative of "1" is going to be stored has contained "1", data representative of "0" is stored instead;

(b) the start constituent dot of the straight line which is going to be stored is stored only when the straight line which is going to be stored has an inclination different in polarity from the precedingly stored straight line; and (c) the constituent dot of each straight line which is going to be stored is stored only when the constituent dot which is going to be stored is shifted in a direction perpendicular to the scanning direction;

(6) scanning those memory locations of the second memory means corresponding to the minimum rectangle to detect the memory locations containing "1" with respect to each scanning line for numbering the detected memory locations, and (7) storing predetermined values into those addresses of the first memory means corresponding to each interval from the odd-numbered memory location to the even-numbered memory location of the second memory means on the corresponding scanning line.

BRIEF DESCRIPTION OF THE DRAWINGS

FIG. 5(A) is an illustration showing one example of two adjoining edges and the vertex of a polygon stored to the working area 108 in accordance with Rule 2 in the system of FIG. 1;

FIG. 5(B) is an illustration showing one example of a combination of one horizontal edge and two edges extending from the opposite ends of the horizontal edge which are stored to the working area 108 in accordance with Rules 2 and 3 in the system of FIG. 1;

FIG. 6(A) is one example of an upwardly-inclined edge L stored to the display memory areas 107A to 107D of the system of FIG. 1;

FIG. 6(B) is similar to FIG. 6(A) but showing the upwardly-inclined edge L stored to the working area 108 in accordance with Rule 3 in the system of FIG. 1;

DESCRIPTION OF THE PREFERRED EMBODIMENTS OF THE INVENTION

An embodiment of the present invention will now be described with reference to the accompanying drawings.

Figure 1:
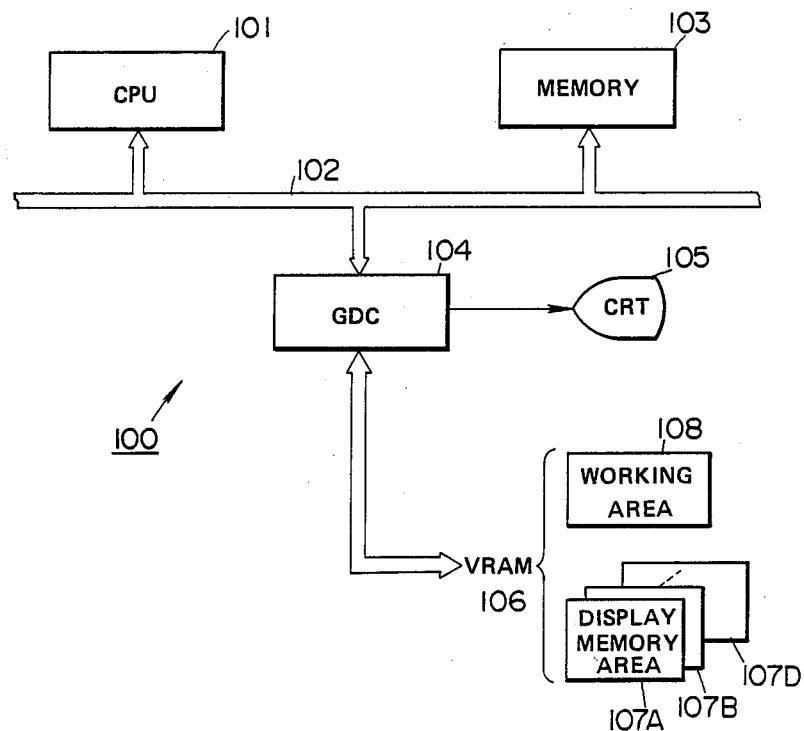
FIG. 1 is a block diagram of a video display system to which a method of filling a polygonal region according to one embodiment of the present invention is applied.

FIG. 1 shows a video display system 100 to which a method of filling a polygonal region according to the present invention is applied. The video display system 100 comprises a CPU 101 which is connected through a bi-directional signal bus 102 to a memory 103 and a graphic display controller (GDC) 104. The CPU 101 creates coordinate data representative of a display position of an image to be displayed and commands for controlling a display of such an image, and supplies the coordinate data and the commands to the graphic display controller 104. The graphic display controller 104 stores an image or a picture to a video RAM (VRAM) 106 (actually, writes data representative of the image into the VRAM 106) in accordance with the coordinate data and the commands fed from the CPU 101. The graphic display controller 104 also sequentially reads the stored image (or the data representative of the image) from the VRAM 106, and supplies the read image data to a CRT display unit 105, whereby the image is displayed on a screen of the CRT display unit 105.

The VRAM 106 comprises four display memory areas 107A, 107B, 107C and 107D and a working area 108. Each of the five areas constitutes a plane of bits which correspond respectively to pixels provided on the screen of the CRT display unit 105. Thus, the five areas are identical in memory capacity. The four display memory areas 107A to 107D cooperate with one another to store a group of display color data each composed of four bits and corresponding to a respective one of the pixels on the screen. The working area 108 stores a group of dot data each composed of one bit and corresponding to a respective one of the pixels on the screen. This working area 108 will be more fully described later.

Figure 2:
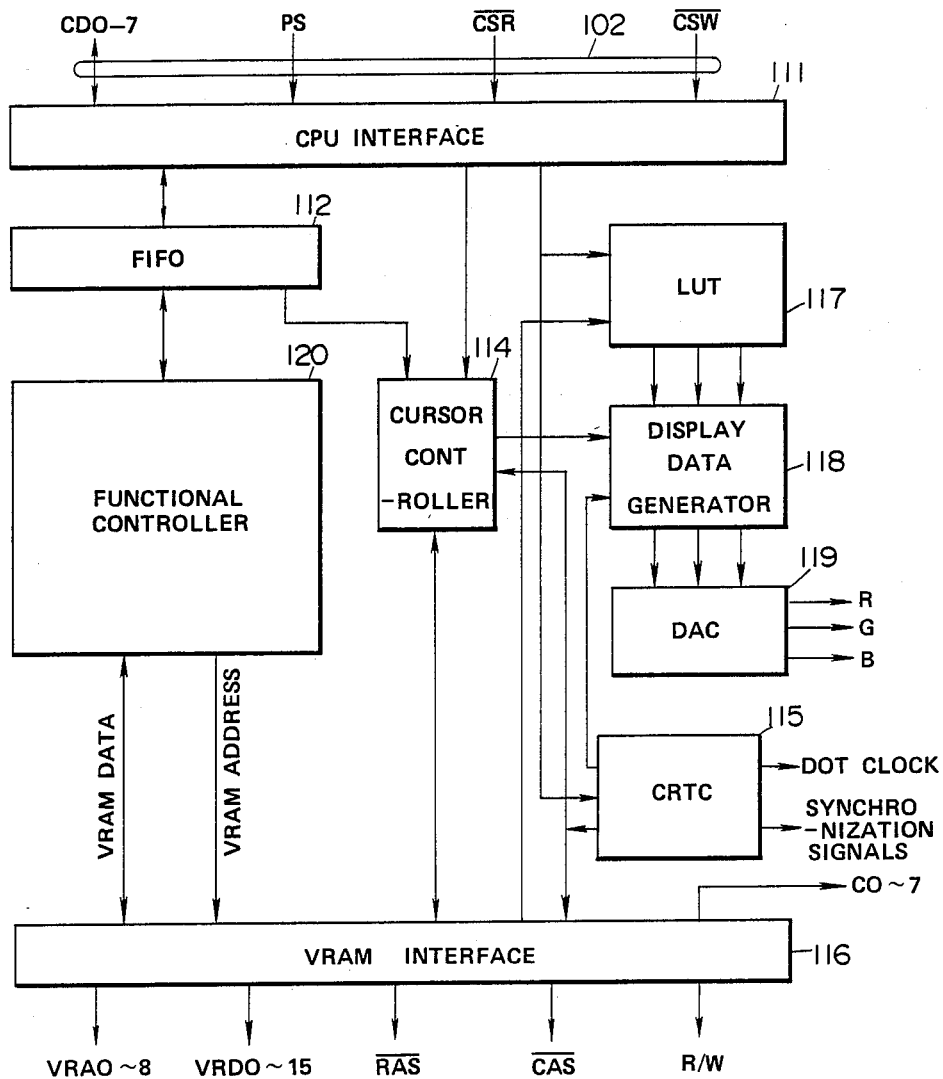
FIG. 2 is a detailed block diagram of the graphic display controller (GDC) 104 of the system of FIG. 1.

As shown in detail in FIG. 2, the graphic display controller 104 comprises a CPU interface 111 which is connected to the CPU 101 through various signal lines of the signal bus 102, namely, a data bus for eight data-bits CD0 to CD7, a port selection line for a port selection signal PS, a chip selection line for a read signal $\overline{CSR}$ and another chip selection line for write signal $\overline{CSW}$. The CPU interface 111 receives through the data bus CD0 to CD7 the coordinate data and the commands from the CPU 101. Each of the commands fed from the CPU 101 to the CPU interface 111 is composed of an operation code and an operand. In this case, the operation code and the operand of each command are inputted respectively into different ports (not shown) of this CPU interface 111 in accordance with the one-bit port selection signal PS.

Each of the commands belongs to one of two kinds of command, namely a normal command for commanding a description of an image, and an immediate command for commanding a rewriting of a cursor or a color table. The kind of each command is determined by the bit CD7 thereof.

The CPU interface 111 determines whether the received command is the normal command or the immediate command. The CPU interface 111 then stores the normal command into a first-in first-out buffer (FIFO) 112 and sends the immediate command to a predetermined portion of this graphic display controller 104 in accordance with the result of the above determination. The CPU interface 111 extracts a register number from the operation code and data from the operand of the command, and outputs the extracted register number and the data.

The FIFO 112 comprises, although not specifically shown in FIG. 2, a write FIFO buffer for temporarily storing the normal command and the data from the CPU 101, a read FIFO buffer for storing data to be supplied to the CPU 101, a controller for controlling writing and reading operation of the write and read FIFO buffers, and an I/0 controller. The I/0 controller discriminates and decodes the operation code and the data of the command, and controls the start and stop of a functional controller 120, as later described, and also effects a transfer of data to and from the functional controller 120. The I/0 controller of the FIFO 112 also outputs data representative of a cursor pattern to a cursor controller 114 in response to the data fed from the CPU 101.

The cursor controller 114 comprises a cursor parameter register for storing data representative of coordinates (X and Y coordinates) of a display position of the cursor, a cursor pattern register for storing the cursor pattern data, a comparator for comparing the coordinates of the cursor display position with a scanning position on the screen of the CRT display unit 105, and a blink counter for controlling a blink of the cursor. When the coordinates of the cursor display position coincide with those of the scanning position, the cursor controller 114 outputs a cursor-on signal to cause the cursor to be displayed. The cursor pattern data is previously stored in the VRAM 106 and is read from the VRAM 106 immediately before the display of the cursor must be effected.

A CRT controller (CRTC) 115 is provided for controlling a display of image on the CRT display unit 105. The CRTC 115 generates timing signals for the CRT display unit 105, namely, a vertical synchronization signal and a horizontal synchronization signal. The CRTC 115 also generates internal timing signals, and outputs read address data for the VRAM 106 to a VRAM interface 116 in synchronization with the internal timing signals. More specifically, the CRTC 115 outputs, to the VRAM 106, address data for reading display data during the display period, address data for reading the cursor pattern data and address data for refreshing the contents of the VRAM 106 in the form of data representative of X and Y coordinates. The X and Y coordinate data thus outputted from the CRTC 115 are converted into the actual address data for the VRAM 106 by the VRAM interface 116.

The VRAM interface 116 produces timing signals for accessing the VRAM 106 based on the internal timing signals fed from the CRTC 115. More specifically, the VRAM interface 116 produces, based on the above internal timing signals, a row address selection signal $\overline{RAS}$, a column address selection signal $\overline{CAS}$ and a read/write signal R/W. The VRAM interface 116 also produces, from the address data for the VRAM 106 in the form of the X and Y coordinates, nine-bit row address signals and nine-bit column address signals which are alternately outputted onto address signal lines VRA0 to VRA8. The VRAM interface 116 further comprises a register for temporarily storing sixteen bit data read from or to be written into the VRAM 106 through data lines VRD0 to VRD15. Each four-bit data read from the display memory areas 107A to 107D of the VRAM 106 through the VRAM interface 116, that is, each color index of pixel, is supplied to a look-up table (LUT) 117. The LUT 117 converts the four-bit color index, composed of four one-bit data read simultaneously respectively from the display memory areas 107A, 107B, 107C and 107D, into data representative of a color value of the corresponding pixel on the screen of the CRT display unit 105. Each color value data outputted from the LUT 117 includes R, G and B data each composed of three bits and a TP bit. More specifically, the LUT 117 is composed of a RAM having a capacity of ten bits by sixteen words, wherein one of the sixteen words is selectively accessed by the aforesaid four-bit color index to read the ten-bit data therefrom as the color value data. The LUT 117 is constructed so that the contents of the RAM thereof can be changed by the CPU 101.

The ten-bit color value data outputted from the LUT 117 is supplied to a display data generator 118. The display data generator 118 is provided mainly for replacing the color value data, fed from the LUT 117 at the time when the cursor is to be displayed on the screen, with the cursor pattern supplied from the cursor controller 114. More specifically, when the cursor-on signal from the cursor controller 114 is active, the display data generator 118 renders the color value data fed from the LUT 117 transparent so that only the cursor is displayed on the screen. The display data generator 118 also outputs data representative of a predetermined border color during the time when the peripheral marginal portion of the screen is scanned so that the peripheral marginal portion of the screen is colored with the border color. The display data generator 118 further renders the color value data fed from the LUT 117 data representative of black during the blanking period of the CRT display unit 105 so that the retracing line is not displayed on the screen. Each data thus outputted from the display data generator 118 is composed of R, G and B color data each composed of three bits.

The R, G and B color data composed of nine bits as a whole and outputted from the display data generator 118 are converted by a digital-to-analog converter (DAC) 119 into red, green and blue signals R, G and B, respectively. These analog signals R, G and B are supplied to the CRT display unit 105 of FIG. 1, whereby each pixel of the image is displayed in the color determined by the signals R, G and B.

Figure 3:
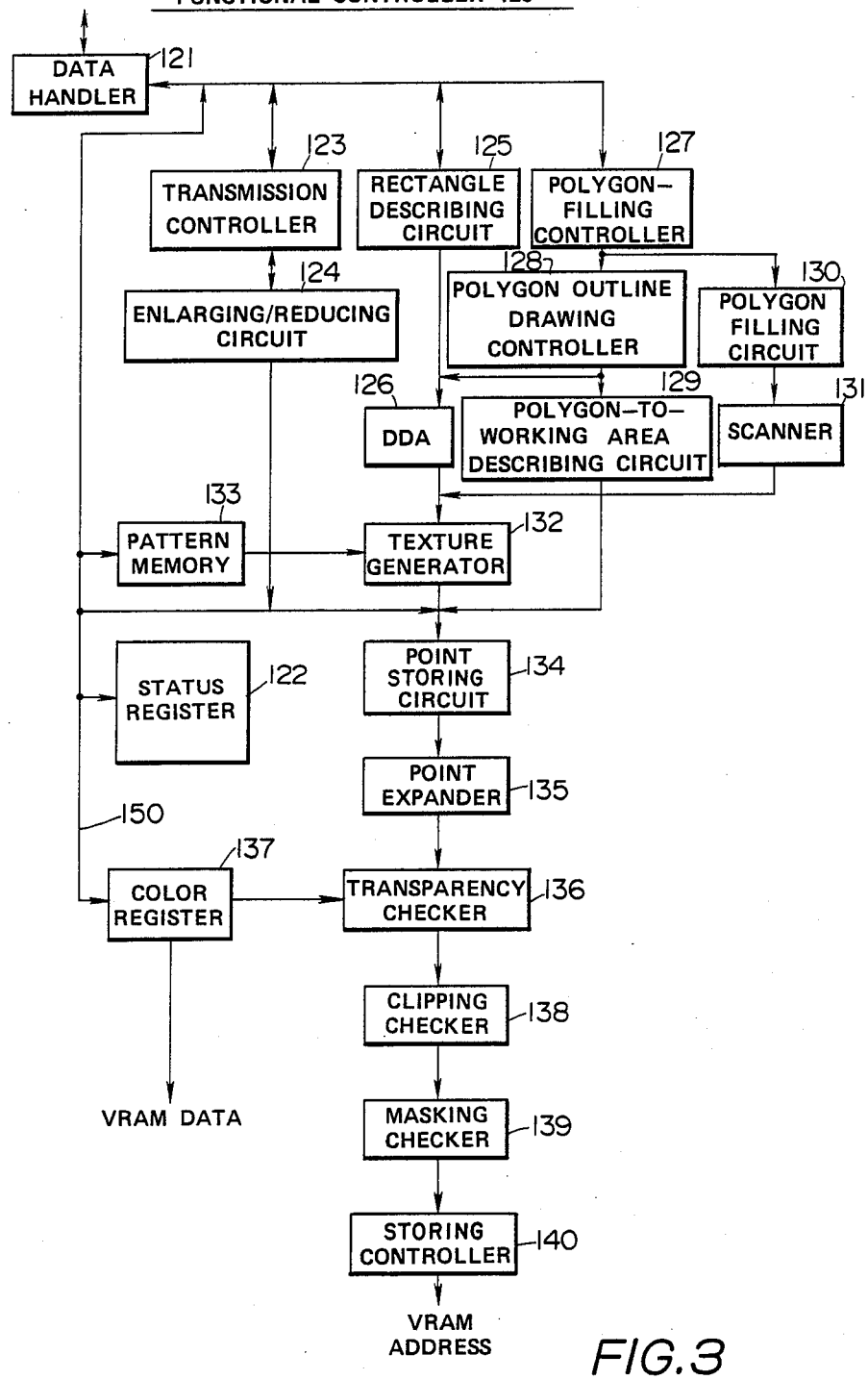
FIG. 3 is a detailed block diagram of the functional controller 120 of the GDC 104 of FIG. 2.

The functional controller 120 will now be more fully described with reference to FIG. 3.

This functional controller 120 is provided for controlling the description of an image to the VRAM 106, that is, the writing of dot data into the VRAM 106. The functional controller 120 comprises a data handler 121 for sending data to or receiving data from the FIFO 112. In this case, the data handler 121 receives from the FIFO 112 the commands and the coordinate data and so on which are needed to store an image to the VRAM 106. The data handler 121 also outputs to the FIFO 112 data to be transmitted to the CPU 101. The data fed from the FIFO 112 to the data handler 121, that is, the commands and the coordinate data, are supplied to a status register 122.

The status register 122 decodes the commands and stores therein all the data relating to the description of an image to the VRAM 106. The data includes data indicative of the addresses corresponding to the image to be written, data indicative of the addresses of the clipping area, data representative of a color of the image, data representative of a background color, and so on. This status register 122 is also connected through an internal signal bus 150 to various other portions of this functional controller 120 to communicate therewith as more fully described later.

A transmission controller 123 is provided for effecting a transmission of data from the data area of the CPU 101 to the VRAM 106 and a transmission of data from the VRAM 106 to the data area of the CPU 101 on a one-bit unit basis or on a one-pixel unit basis. The transmission controller 123 controls the direction of each data transmission and converts the format of the data to be transmitted.

An enlarging/reducing circuit 124 is provided for automatically enlarging or reducing the size of the image to be transmitted in accordance with the size of the source data area (the imaginary rectangular data area of the CPU 101 or the VRAM 106 from which the data is transmitted) and that of the destination data area (the imaginary rectangular data area of the VRAM 106 or the CPU 106 to which the data is transmitted).

A rectangle describing circuit 125 receives data relating to a pair of vertices of a rectangle disposed on a diagonal thereof from the status register 122, and converts the data into a straight-line drawing command for describing the four edges (or sides) of the rectangle. The straight-line drawing command is supplied to a digital differential analyzer (DDA) 126.

The DDA 126 is a well-known circuit means for generating, from the coordinates of the start and end points of a straight line to be drawn, data representative of coordinates of dots constituting the straight line. The above-described rectangle describing circuit 125 cooperates with the DDA 126 to provide all the data necessary for drawing a rectangle.

Circuit elements for filling a polygonal region will now be described.

A polygon-filling controller 127 receives data representative of all the vertices of a polygon to be described from the data handler 121, determines whether an outline (i. e., edges) of the polygon is to be drawn or whether the polygonal region is to be filled, and effects necessary controls in accordance with the result of the determination. A polygon outline drawing controller 128 controls drawing of an outline of a polygon to the four display memory areas 107A to 107D of the VRAM 106. More specifically, the polygon outline drawing controller 128 outputs data representative of the start and end points of each edge of the polygon to the DDA 126 to cause it to generate data representative of the constituent dots of the respective edges of the polygon.

A polygon-to-working area describing circuit 129 carries out a control for describing an image corresponding to the outline of the polygon (i. e., a frame defining a region to be filled) to the working area 108 of the VRAM 106 in accordance with the dot data fed from the DDA 126. An algorithm for drawing the outline of the polygon to the working area 108 will be more fully described later.

A polygon filling circuit 130 controls a scanner 131 so that the scanner 131 reads in a scanning manner only those dot data within the minimum rectangular area which includes the polygon to be filled. The scanner 131 scans the working area 108 within the above minimum rectangular area and detects those addresses corresponding to the polygonal region to be filled.

When the straight lines (the edged of the polygon) and the horizontal line-components of the polygon have thus been determined, data representative of the dots constituting the straight lines and the horizontal line-components are supplied one by one to a texture generator 132. The texture generator 132 determines whether the dot represented by each dot data fed from the scanner 131 is to be displayed or not in accordance with the command which determines whether the edge is to be displayed as a solid line or as a broken line. More specifically, the texture generator 132 supplies data representative of the X and Y coordinates of each dot to a pattern memory 133 which stores textures for the edges (straight lines) and the region to be filled, reads dot data determined in accordance with the selected texture and the X and Y coordinates, and generates the value of "1" or "0" corresponding to the above dot on the selected texture.

When the coordinates and the value of the dot or point to be stored have thus been determined, a point storing circuit 134 describes one pixel. This description of the pixel is performed, in the following manner.

A point expander 135 enlarges one pixel into one pel. The pel is a logical size of a picture element and is composed, for example, of 1×1 pixel in the case of a normal line. In the case of a thick line, one pel is composed, for example, of 2×3 pixels. The size of one pel is stored in the status register 122.

A transparency checker 136 determines whether the color of the point, which is going to be stored, is to be rendered transparent. If it is determined that the color is to be rendered transparent, the transparency checker 136 prevents the point from being stored. This command is determined in accordance with a command data fed from the CPU 101 and is supplied to the transparency checker 136 through a color register 137. For example, a broken line is to be drawn, the background color of the interval between each adjoining dots is rendered transparent so that the broken line becomes distinct.

The color register 137 stores each four-bit color index to be written into the display memory areas 107A, 107B, 107C and 107D, and also stores the color index read from display memory areas 107A, 107B, 107C and 107D.

A clipping checker 138 determines whether the point to be described is disposed inside or outside the clipping area. The clipping area is given as a rectangular area, and the clipping checker 138 comprises four registers for respectively storing the minimum and the maximum coordinates $X_l$ and $X_h$ of the rectangular area in the horizontal (or X) direction and the minimum and the maximum coordinates $Y_l$ and $Y_h$ of the rectangular area in the vertical (or Y) direction, and a comparator for determining whether the point to be stored is disposed within the rectangular area. If it is determined that the point to be stored is disposed within the rectangular area, the clipping checker 138 outputs data representative the address of the VRAM 106 at which the point is to be stored.

A masking checker 139 is provided for comparing masking data formed in the working area 108 with the point (dot) to be stored to determine whether the point is to be masked off. If it is determined that the point is to be masked off, the point is not stored, that is to say, the address data of the point is not outputted.

A storing controller 140 outputs each address data selectively to the display memory areas 107A to 107D and the working area 108, wherein the address data for the VRAM 106 takes the form of data representative of the coordinates. As a result, the color index contained in the color register 137 is stored to (or written into) the address of the VRAM 106 determined by the address data outputted from the storing controller 140 through the aforesaid VRAM interface 116. In this case, the address data outputted from the storing circuit 140 is converted into the address data representative of the actual address of the VRAM 106.

The operation of this embodiment for filling the polygonal region will now be described.

Each step of the processing for filling the polygonal region will be first described.

Step 1

All the registers concerned are cleared.

Step 2

The polygon-filling controller 127 receives the coordinate data of the starting vertex of the polygon to be filled, i. e., one of the vertices of the polygon, and determines the maximum coordinates $X_h$ and $Y_h$ and the minimum coordinates $X_l$ and $Y_l$ of a rectangle which includes the received vertex.

Step 3

The polygon-filling controller 127 receives the coordinate data of the next vertex of the polygon, and determines whether the newly received vertex is disposed within the rectangle defined by the maximum coordinates $X_h$ and $Y_h$ and the minimum coordinates $X_l$ and $Y_l$ determined in the preceding step. If the coordinates of the newly received vertex are outside the rectangle, then the maximum coordinates $X_h$ and $Y_h$ and the minimum coordinates $X_l$ and $Y_l$ are changed to new values to form a new rectangle which includes all the received vertices. If the coordinates of the newly received vertex are inside the rectangle, the maximum coordinates $X_h$ and $Y_h$ and the minimum coordinates $X_l$ and $Y_l$ are not changed. In this case, the processing jumps to Step 5.

Step 4

Figure 4:
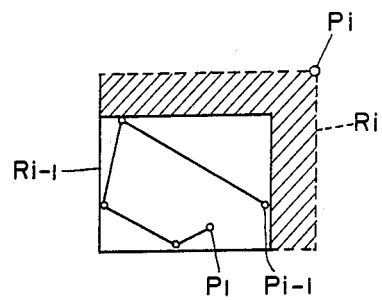
FIG. 4 is an illustration showing one example of vertices of a polygon and a rectangular area of the working area 108 defined by the vertices in the system of FIG. 1.

If any one of the maximum coordinates $X_h$ and $Y_h$ and the minimum coordinates $X_l$ and $Y_l$ is changed in Step 3, that portion of the working area corresponding to the area of the rectangle which has been increased as the result of the change of the maximum coordinates $X_h$ and $Y_h$ and the minimum coordinates $X_l$ and $Y_l$ is cleared. FIG. 4 shows one example of this processing. In FIG. 4, a point $P_1$ is the starting vertex of the polygon to be filled, a point $P_{i-1}$ the vertex precedingly received, a rectangle $R_{i-1}$ the rectangle defined by the maximum coordinates $X_h$ and $Y_h$ and the minimum coordinates $X_l$ and $Y_l$ determined in the preceding step, a point $P_i$ the vertex newly received, and a rectangle $R_i$ the rectangle obtained as the result of the change of the maximum coordinates $X_h$ and $Y_h$ and the minimum coordinates $X_l$ and $Y_l$. The area filled with slant lines is the area which has been increased as the result of change of the maximum coordinates $X_h$ and $Y_h$ and the minimum coordinates $X_l$ and $Y_l$, and must therefore be cleared.

Step 5

A straight line or an edge connecting the precedingly received vertex to the newly received vertex is drawn to the display memory areas 107A to 107D. The straight line (edge) is also drawn to the working area 108 in accordance with predetermined rules which will be described later. In this case, if the newly received vertex is the last vertex of the polygon, then an additional straight line (edge) connecting the last vertex to the starting vertex is drawn in the same manner. If the newly received vertex is not the last vertex of the polygon, then the processing returns to Step 3. The drawing of the straight line to the display memory areas 107A to 107D is actually performed by the polygon outline drawing controller 128 and the DDA 126, while the drawing of the straight line to the working area 108 is actually performed by the polygon-to-working area describing circuit 129 and the DDA 126.

Step 6

The rectangular area formed in the working area 108 is scanned to detect the outline of the polygon drawn to the working area 108, and the polygonal region within the display memory areas 107A to 107D is filled in accordance with the result of detection of the outline drawn to the working area 108, as more fully described later.

The rules in accordance with which each straight line (edge) is drawn to the working area 108n will now be described.

Rule 1

When a constituent dot of a straight line is stored to the working area 108, the one bit data contained in the corresponding address of the working area 108 is inverted (toggled). For example, if the address of the working area 108 to which a dot is to be stored contains "0", "1" is written into the address. On the other hand, if the address to which a dot is to be stored contains "1", "0" is written into the address. Thus, if a dot of a straight line is stored even-number times to the same address, the data in the address resumes the original value.

Rule 2

A special processing is performed with respect to each vertex of the polygon. More specifically, the start point of the straight line or edge which is going to be drawn is stored only when the inclination of this edge is different in polarity from that of the precedingly stored edge. Referring to FIG. 5(A), it is now assumed that two adjoining edges $E_{i-1}$ and $E_i$ are drawn. In this case, although the edges $E_{i-1}$ and $E_i$ are different in magnitude of inclination from each other, they have the same polarity of inclination. Therefore, the start point P of the edge $E_i$ is not stored. However, the point P has already been stored as the end point of the preceding edge $E_{i-1}$. Thus, the vertex between two adjoining edges equal in polarity of inclination to each other is stored only once, so that the dot data in the address of the working area 108 corresponding to the vertex is rendered "1". It is now assumed that two adjoining edges $E_{i-1}$ and $E_i'$ are drawn. In this case, the edges $E_{i-1}$ and $E_i'$ are different in polarity of inclination from each other. Therefore, the start point P of the edge $E_i'$ is stored. The point P has also been stored as the end point of the preceding edge $E_{i-1}$. Thus, the vertex between two adjoining edges different in polarity of inclination from each other is stored twice, so that the dot data in the address of the working area 108 corresponding to the vertex is rendered "0".

A horizontal edge is not drawn at any, constituent points thereof including the start and end points in accordance with Rule 3 which will be described later.

Drawing of two edges extending from opposite ends of a horizontal edge is performed in the following manner. It is now assumed that adjoining three edges $E_{j-2}$, $E_{j-1}$ and $E_j$ shown in FIG. 5(B) are stored, wherein the intermediate edge $E_{j-1}$ is horizontally disposed. In this case, the horizontal edge $E_{j-1}$ is not drawn as described above. If first and second edges extending from opposite ends of a horizontal edge are equal in polarity of inclination, the start point of the second edge, disposed at the end point of the horizontal edge, is not stored. Therefore, neither the end point of the edge $E_{j-1}$ nor the start point P of the edge $E_j$ is stored. Thus, although the vertex or point Q is stored as the end point of the edge $E_{j-2}$, the vertex (point) P is never stored. As a result, the data in the address of the working area 108 corresponding to the point Q is inverted (or rendered "1"), while the data in the address of the working area 108 corresponding to the point P is maintained as it is (or maintains "0").

It is now assumed that three adjoining edges $E_{j-2}$, $E_{j-1}$ and $E_j'$ shown in FIG. 5(B) are stored, wherein the edges $E_{j-2}$ and $E_j'$ are different in polarity of inclination from each other. In this case an exception to the previous processing is made, the start point Q of the horizontal edge $E_{j-1}$ is stored, and the start point P of the edge $E_j'$ is not stored. Thus, the point Q is first stored as the end point of the edge $E_{j-2}$ and is then stored as the start point of the edge $E_{j-1}$. As a result, the point Q is stored twice, so that the data in the address of the working area corresponding to the point Q resumes the original value of "0". On the other hand, the point P is never stored, so that the data in the address of the working area 108 corresponding to the point P maintains its original value of "0". The reason why the above processing exception is performed is that since the horizontal edge $E_{j-1}$ has already been drawn to the display memory areas 107A to 107D during the description of the outline of the polygon, it is not necessary to again draw the edge during the filling processing.

Rule 3

When storing constituent dots or points of a straight line to the working area 108, the dot presently processed (or the current dot) is stored only when the current dot is shifted in the vertical direction from the precedingly stored dot. This will become apparent from the example shown in FIGS. 6(A) and 6(B). FIG. 6(A) illustrates an upwardly-inclined straight line L stored to the display memory areas 107A to 107D, wherein some of the constituent dots $P_1$ to $P_8$ of the line L are shown. On the other hand, FIG. 6(B) illustrates the same straight line L stored to the working area 108. As will be appreciated from FIG. 6(B), only those constituent dots (for example, the dots $P_1$, $P_3$, $P_5$ and $P_7$) of the line L which are shifted in the vertical direction respectively from their preceding dots are stored, and those dots which follow each of the vertically shifted dots on the same horizontal line are not stored.

Figure 7:
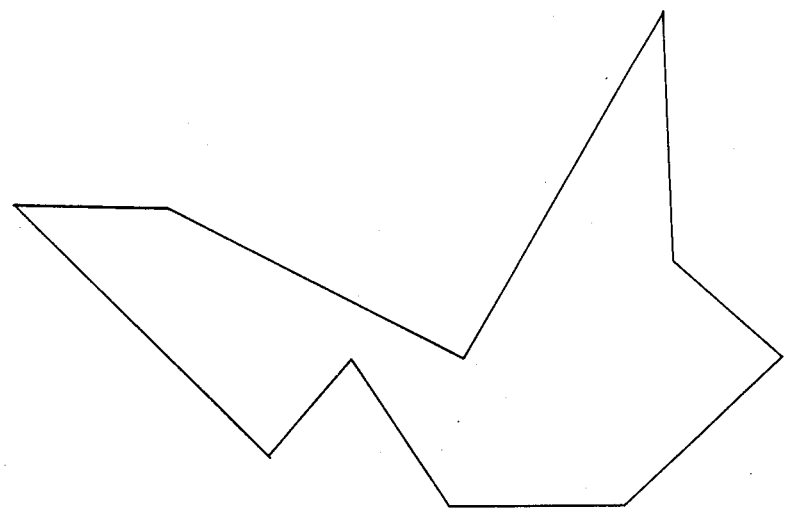
FIG. 7 is an illustration showing one example of a polygon to be displayed in the system of FIG. 1.
Figure 8:
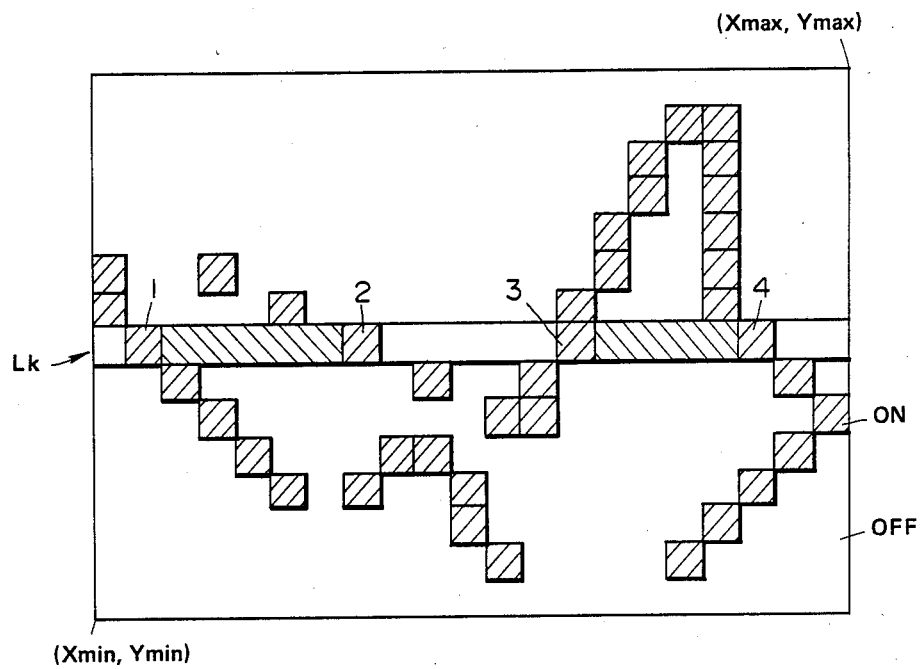
FIG. 8 is an illustration showing the outline or frame of the polygon of FIG. 7 stored to the working area 108 in the system of FIG. 1.
Figure 9:
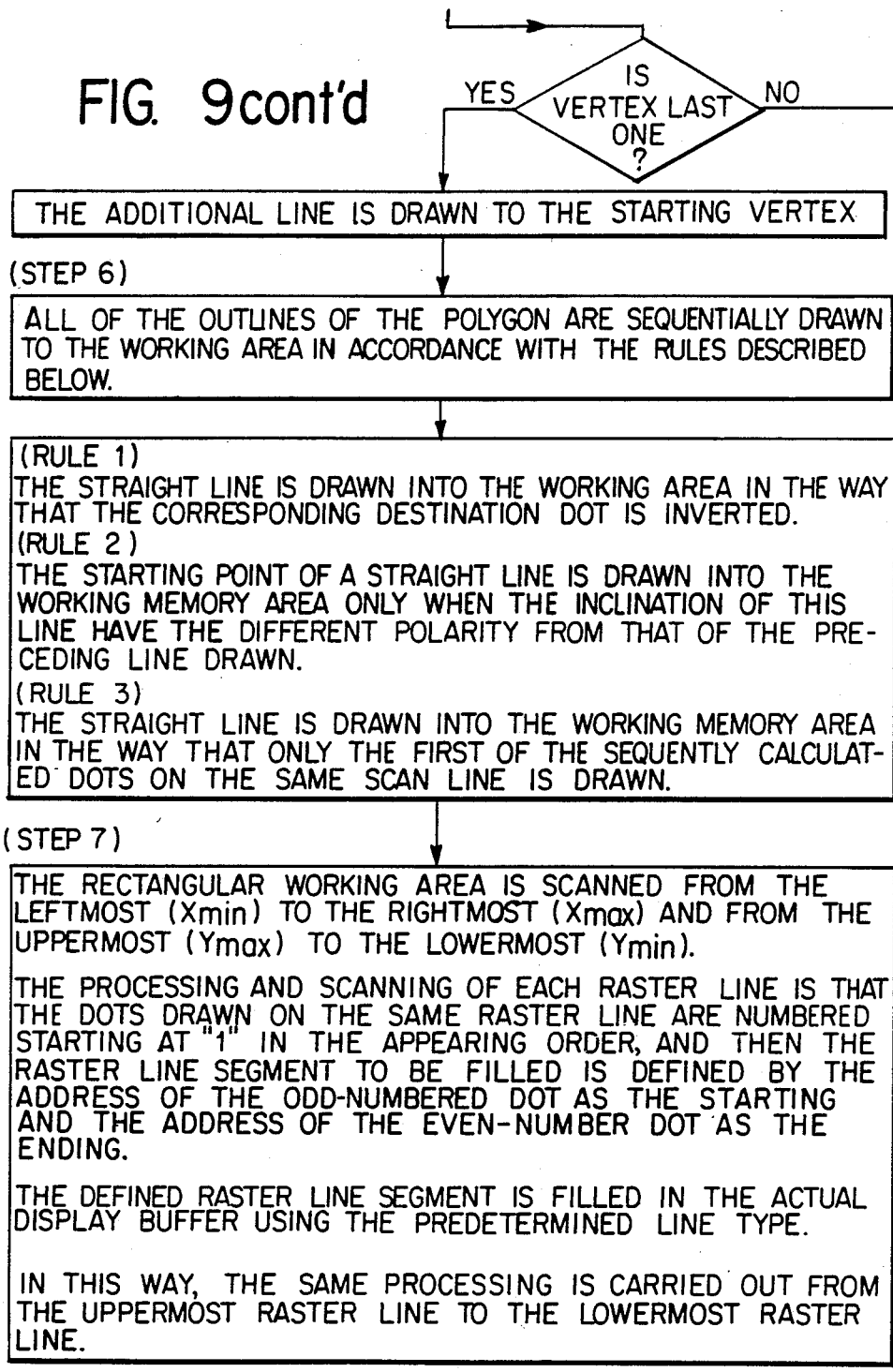
FIG. 9 is a representational flow chart of an algorithm for filling a polygonal region according to the invention.

All of the edges (straight lines) of the polygon are sequentially drawn to the working area 108 in accordance with the above-described Rules 1 to 3. As a result, a frame defining the polygonal region to be filled is formed in the working area 108. For example, in the case where a polygon shown in FIG. 7 is to be displayed, a frame such as one shown in FIG. 8 is formed in a rectangular area in the working area 108. In FIG. 8, the frame is represented by dots each filled with slants. The rectangular area is defined by the four coordinate data, namely the maximum X coordinate $X_{max}$, the maximum Y coordinate $Y_{max}$, the minimum X coordinate $X_{min}$ and the minimum Y coordinate $Y_{min}$ (refer to Step 3). The rectangular area is scanned from the leftmost dot (the leftmost address) defined by $X_{min}$ to the rightmost dot (the rightmost address) defined by $X_{max}$ and from the uppermost row of addresses (the uppermost horizontal scanning line) defined by $Y_{max}$ to the lowermost row of addresses (the lowermost horizontal scanning line) defined by $Y_{min}$. During the scanning of each horizontal scanning line, the dots on the same horizontal scanning line are numbered from "1" in the appearing order. For example, the kth horizontal scanning line $L_k$ of the rectangular area of FIG. 8 includes four dots, so that those dots are numbered from the leftmost one to the rightmost one as "1", "2", "3" and "4". Then, those addresses of the display memory area 107A to 107D which correspond to each interval from the odd-numbered dot to the even-numbered dot on each horizontal scanning line of the rectangular area of FIG. 7 (in the case of the kth scanning line, the intervals filled with reversed slants) are filled (or described) with dots of the predetermined texture. As a result, a polygon completely filled with dots of the predetermined texture is formed in the display memory areas 107A to 107D. The foregoing is the processing to be carried out in the aforesaid Step 6. The contents of the display memory areas 107A to 107D are sequentially read and outputted to the CRT display unit 105 by the GDC 104, so that the polygon stored to these display memory areas 107A to 107D is displayed on the screen of the CRT display unit 105 with the texture.

Thus, according to the above-described method, the following advantages can be obtained:

(a) A polygon to be displayed is not limited in the number of vertices.

(b) Only a simple algorithm is required.

(c) Even a polygon of a complicated shape, such as a concave polygon and a polygon having intersecting edges, can be filled.

(d) The polygon can be partially filled if desired.

(e) The portion of the working area which must be cleared is the minimum rectangular area determined by the polygon to be displayed. Therefore, the time required to process the polygon is much saved with respect to the conventional method in which the entire portion of the working area must have been cleared.

What is claimed is:

1. A method of filling a polygonal region with valued pixels to display a polygon corresponding to the polygonal region on a display screen of a raster-scan type display unit which screen provides a matrix array of pixels comprising the steps of:

providing first memory means having a matrix array of addresses each for storing a value of a respective one of the pixels provided on the display screen, second memory means having a matrix array of memory locations corresponding respectively to said addresses of said first memory means, and control means for entering data into addresses of said first and second memory means and for sequentially reading the values from said addresses of said first memory means to display on the display screen a polygon represented by said values read from said addresses;

producing data representative of vertices of said polygon;

determining a minimum rectangle which includes said polygon based on said data representative of said vertices and clearing those memory locations of said second memory means corresponding to said minimum rectangle;

determining those addresses of said first memory means corresponding to constituent dots of straight lines each connecting a respective one of adjoining pairs of said vertices and determining those memory locations of said second memory means corresponding to said constituent dots of said straight lines;

storing said straight lines to said first memory means by storing a predetermined display data value for each constituent dot into said addresses of said first memory means, and sequentially storing said straight lines to said second memory means by storing data representative of "1" into said those memory locations of said second memory means in accordance with the following rules (a), (b) and (c):

(a) when the memory location to which the data representative of "1" is going to be stored has contained a "1", data representative of "0" is stored instead;

(b) a constituent dot representing the start of the straight line which is going to be stored is stored only when the straight line which is going to be stored has an inclination different in polarity from the precedingly stored straight line; and (c) the constituent dot of each straight line which is going to be stored is stored only when the constituent dot which is going to be stored is shifted in a direction perpendicular to the scanning direction;

scanning those memory locations of said second memory means corresponding to said minimum rectangle to detect the memory locations containing "1" with respect to each scanning line for numbering with consecutive integers the detected memory locations, and storing predetermined values into those addresses of said first memory means corresponding to each interval from the odd-numbered memory location to the even-numbered memory location of said second memory means on the corresponding scanning line.

2. A method of filling a polygonal region according to claim 1, wherein said first memory means comprises a plurality of memory areas each having a matrix array of storage locations each corresponding to a respective one of said pixels provided on the display screen, each group composed of the corresponding storage locations of said plurality of memory areas forming a respective one of said addresses of said first memory means, each of the values to be stored into a respective one of the storage location groups of said plurality of memory areas being data representative of a color of the corresponding pixel.

* * * * *